United States Patent
Lepore

[15] 3,641,639
[45] Feb. 15, 1972

[54] FIN-SHEARING MACHINE

[72] Inventor: John B. Lepore, P. O. Box 107, Landing, N.J. 07850

[22] Filed: Feb. 5, 1970

[21] Appl. No.: 8,802

[52] U.S. Cl. .................................. 29/1.2, 83/599, 83/648, 83/914
[51] Int. Cl. .................................................... B21k 21/06
[58] Field of Search .................. 83/599, 598, 200, 401, 914, 83/648; 29/1.2

[56] References Cited

UNITED STATES PATENTS

| | | | |
|---|---|---|---|
| 663,998 | 12/1900 | McCabe | 83/200 X |
| 1,883,567 | 10/1932 | Christman | 83/200 |
| 3,389,629 | 6/1968 | Tamburr | 83/599 X |

Primary Examiner—James M. Meister
Attorney—Harry M. Saragovitz, Edward J. Kelly, Herbert Berl and S. Dubroff

[57] ABSTRACT

A compact and lightweight machine for accurately and quietly shaping the peripheral contour of radially extending projectile fins in a single operation. The machine die arrangement includes a group of arcuate inwardly facing cutting surfaces formed on circumferentially spaced segmental members that are secured to an annular ring which is circumferentially reciprocated in a die baseplate annular recess by a pair of fluid work cylinders. Corresponding work support members secured to the baseplate have external surfaces mating with respective circumferentially reciprocable, segmental member cutting surfaces. After a finned workpiece is positioned on the work support within the die, depending guide members on an air cylinder operated positioning mechanism piston descend into corresponding vertical apertures provided in the work support members prior to the fin-shaping operation performed by the cutting surfaces.

6 Claims, 3 Drawing Figures

INVENTOR.
JOHN B. LEPORE
BY: *Harry M. Saragovitz,*
*Edward J. Kelly, Herbert Berl &*
*S Dubroff* ATTORNEYS.

FIN-SHEARING MACHINE

The invention described herein may be manufactured, used, and licensed by or for the Government for governmental purposes without the payment to me of any royalty thereon.

This invention relates to a machine for shaping projectile fins and, more particularly, to a machine for shaping or shearing the peripheral contour of radially extending projectile fins.

One of the objects of the invention is to provide a compact and lightweight machine for accurately and quietly shaping the peripheral contour of projectile fins in a single operation.

Another object of the invention is to provide such a machine that eliminates the prior need for expensive bar chuckers, skilled help and punch presses.

A further object of the invention is to provide such a machine that will produce, with a minimum of cost, an improved, substantially stress-free, concentric fin product for use in munitions.

These and other objects, features and advantages will become more apparent from the following description and accompanying drawings in which.

Figure 1:
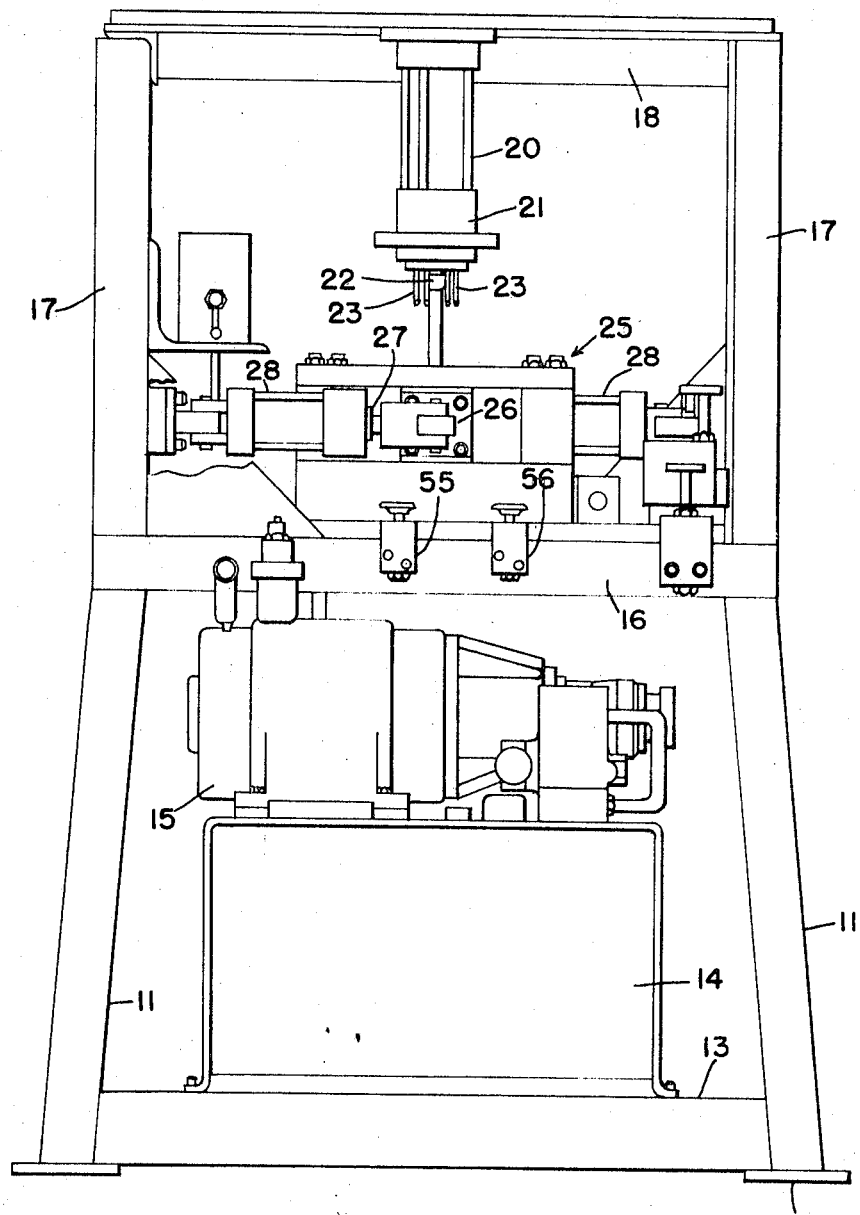
FIG. 1 is an elevational view of a machine embodying the principles of the invention.

The fin-shearing or shaping machine, shown generally at 10 (FIG. 1), has a support frame that includes four lower legs 11 each inclined inwardly somewhat from an upright or vertical orientation for purposes of stability. Each leg 11 has a foot member 12 to which is suitable secured a base 13 for securely supporting a fluid or oil reservoir 14 and its associated pump apparatus 15. Each of the feet 12 may be provided with appropriate roller means (not shown) to facilitate portability of the machine. A horizontal platform 16 connects the upper ends of lower legs 11 and has four upright members 17 suitably secured thereto which in turn sturdily support the horizontally extending uppermost frame member 18. A positioning mechanism has its cylinder housing 20 secured to top frame member 18 and its piston rod plate 21 is vertically movable or reciprocable as controlled by an appropriate pneumatic control system (not shown). The positioning mechanism piston 21, suspended substantially centrally within the uprights 17, carries a centering member 22 and a plurality of depending guide members 23 for a purpose to be described.

Figure 2:
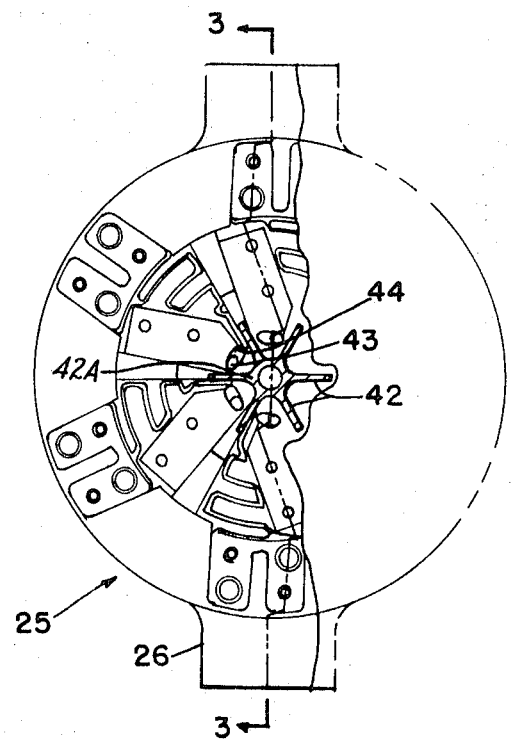
FIG. 2 is an enlarged plan view of the die and shear assembly in the FIG. 1 machine.

A die and shear assembly, shown generally at 25, (FIGS. 1, 2) is suitably mounted on platform 16 and has a pair of circumferentially reciprocable, diametrically opposed lug or protruding members 26 which are appropriately linked or connected to a corresponding horizontally reciprocable piston rod 27 that extends inwardly from respective hydraulic work cylinders 28. Appropriate conduits (not shown) connect the cylinders 28 with pump unit 15 such that identical or simultaneous arcuate motion is imparted to lugs 26.

Figure 3:
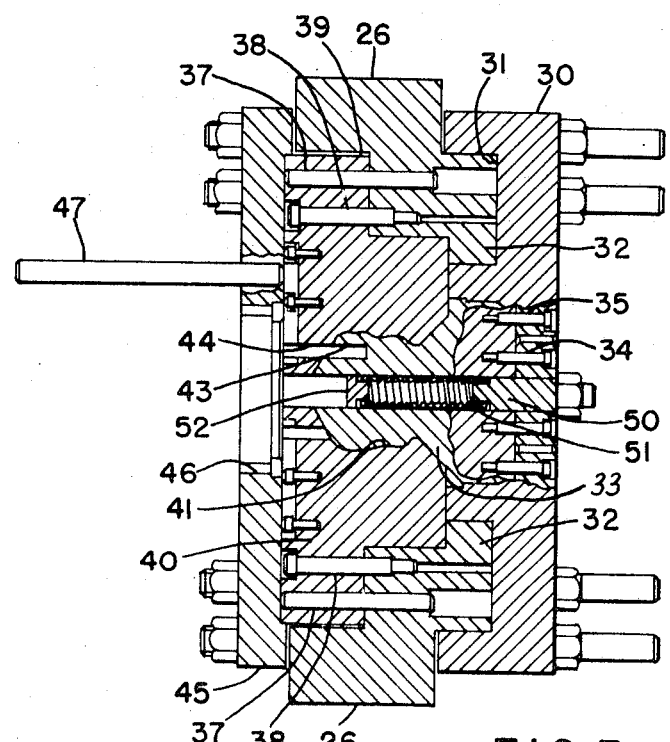
FIG. 3 is a sectional view taken along line 3—3 of FIG. 2.

The die baseplate 30 (FIG. 3) has an upwardly opening annular recess 31 in which is slidably mounted a plate drive assembly having an annular ring 32 and its integral, laterally protruding, diametrically opposed lugs 26. A plurality (preferably six) of circumferentially spaced work support members 33 are secured in an upwardly opening central recess of the baseplate 30 by appropriate screws 34, 35. Suitably secured to predetermined slotted surfaces of ring 32, as by bolt means 37, 38 are a radially outwardmost mating flange 39 of a corresponding one of circumferentially spaced segmental members 40. Each segment 40 has an inwardly facing cutting surface 41 that mates with at least a portion of and is circumferentially reciprocable relative to the outer surface of the respective work support 33. The work supports and segments are arranged in pairs such that predetermined intermediate spaces remain for prepositioning the fins 42 (FIG. 2) of the projectile member or work piece annulus. Each work support member 33 has an upwardly opening, vertically extending aperture 43 (FIGS. 2, 3) which aligns with a corresponding overlying arcuate slot 44 provided in the respective segmental members 40 and receives one of the depending guide members 23 as it descends between a pair of adjacent workpiece fins 42 when the pneumatic control system of the positioning mechanism is operated. The top plate 45 (FIG. 3) of the die and shear assembly has a large central opening 46 to accommodate the guides 23 and centering member 22 that functions to center an appropriately apertured central portion 42A of the finned work piece. The top plate 45 has an upstanding, offset guide rod 47 (FIGS. 1, 3) adapted to be received by a suitable opening in the piston rod plate 21 for facilitating the guide functioning of members 23.

A central tapped opening in the base plate 30 enables mounting therein an adjustably threaded rod 50 that extends upward centrally of the work supports 33 and has its upper portion peripherally recessed to seat compression spring 51. A stop member 52 has its lower portion peripherally recessed and seated in the upper end of spring 51 to biasingly support the work piece central portion 42A during machine operation.

A pair of palm button valves 55, 56 (FIG. 1) are mounted on the platform 16 adjacent the front of the machine and are necessarily depressed simultaneously by an operator during machine operation. The valves control an appropriate switching arrangement (not shown) that actuates the operation of the machine only when both safety valves are simultaneously depressed.

After a finned work piece 42 is positioned on the work support within the die, depending guide members 23 on the air cylinder operated positioning member piston 21 descend into corresponding vertical apertures 43 prior to the fin shaping operation performed by the cutting surfaces 41.

I wish it to be understood that I do not desire to be limited to the exact details of construction shown and described, for obvious modifications will occur to a person skilled in the art.

I claim:

1. In a machine for shaping the contour of projectile fins having a plurality of upright frame members and a horizontally extending platform interconnecting said frame members,
   a positioning mechanism comprising an air cylinder secured to said frame members and vertically movable piston slidably mounted in said air cylinder and suspended within said frame members,
   a die baseplate secured to said platform and having an upwardly opening annular recess,
   an annular ring slidably mounted in said recess for circumferential reciprocation and having a pair of laterally protruding, diametrically opposed lugs,
   a plurality of circumferentially spaced segmental members secured to said ring, each segmental member having an inwardly facing cutting surface and an arcuate slot,
   a plurality of work support members secured to said baseplate and with each having an external surface mating with a corresponding segmental member cutting surface, each work support member having a vertical aperture in alignment with the arcuate slot of the respective segmental member,
   a centrally apertured retaining plate overlying said segmental members and secured to said baseplate,
   a pair of fluid work cylinders each having a piston connected to a corresponding one of said lugs, and
   a plurality of depending guide members on said positioning mechanism piston, each of said guide members being vertically aligned with a corresponding one of said work support vertical apertures.

2. The structure of claim 1 wherein said die baseplate has a central threaded opening with a rod adjustably secured therein, a compression spring seated on said rod, and a stop member seated on said spring and positioned centrally of said work support members.

3. A die and shear assembly for shaping the contour of projectile fins comprising
   a die baseplate having an upwardly opening annular recess,
   an annular ring slidably mounted in said recess for circumferential reciprocation and having a pair of laterally protruding, diametrically opposed lugs, a plurality of circumferentially spaced segmental members secured to said ring, each segmental member having an inwardly facing cutting surface and an arcuate slot, a plurality of work support members secured to said baseplate and with each having an external surface mating with a corresponding segmental member cutting surface, each work support member having a vertical aperture aligned with the arcuate slot of the respective segmental member, and a centrally apertured retaining plate overlying said segmental members and secured to said baseplate.

4. The structure of claim 3 wherein a stop member is positioned centrally of said work support members and seated on an adjustable compression spring.

5. In a machine for shaping the contour of projectile fins having a plurality of upright frame members and a horizontally extending platform interconnecting said frame members, a positioning mechanism comprising an air cylinder secured to said frame members and vertically movable piston slidably mounted in said air cylinder and suspended within said frame members, a die baseplate secured to said platform, a plurality of circumferentially spaced segmental members mounted upon said die baseplate for circumferential reciprocation relative to said base plate each segmental member having an inwardly facing cutting surface, a plurality of work support members secured to said baseplate and with each having an external surface mating with a corresponding segmental member cutting surface, and fluid work cylinder means connected to said segmental members for circumferentially reciprocating said segmental member cutting surfaces.

6. A die and shear assembly for shaping the contour of projectile fins comprising a die baseplate having an upwardly opening annular recess, an annular ring slidably mounted in said recess for circumferential reciprocation and having a pair of laterally protruding, diametrically opposed lugs, a plurality of circumferentially spaced segmental members mounted upon said die baseplate for circumferential reciprocation relative to said baseplate, each segmental member having an inwardly facing cutting surface, a plurality of work support members secured to said baseplate and with each having an external surface mating with a corresponding segmental member cutting surface, and fluid work cylinder means connected to said segmental members for circumferentially reciprocating said member cutting surfaces.

* * * * *